(12) United States Patent
Keffeler et al.

(10) Patent No.: US 10,549,419 B1
(45) Date of Patent: Feb. 4, 2020

(54) WIRE CUTBACK TEMPLATE

(71) Applicants: Mark G. Keffeler, Omaha, NE (US); David P. Keffeler, Omaha, NE (US)

(72) Inventors: Mark G. Keffeler, Omaha, NE (US); David P. Keffeler, Omaha, NE (US)

(*) Notice: Subject to any disclaimer, the term of this patent is extended or adjusted under 35 U.S.C. 154(b) by 222 days.

(21) Appl. No.: 15/894,127

(22) Filed: Feb. 12, 2018

(51) Int. Cl.
| | |
|---|---|
| *B25H 7/02* | (2006.01) |
| *H02G 1/12* | (2006.01) |
| *G01B 5/14* | (2006.01) |
| *G01B 3/14* | (2006.01) |

(52) U.S. Cl.
CPC ............. *B25H 7/02* (2013.01); *G01B 3/14* (2013.01); *G01B 5/14* (2013.01); *H02G 1/12* (2013.01)

(58) Field of Classification Search
CPC .... B25H 7/02; G01B 3/14; G01B 5/14; B43L 7/02; B43L 7/027
USPC ...... 33/679.1, 474, 476, 481, 492, 562, 563, 33/566, 501.45
See application file for complete search history.

(56) References Cited

U.S. PATENT DOCUMENTS

| | | | | | |
|---|---|---|---|---|---|
| 1,034,547 | A | * | 8/1912 | Welsh | G01B 3/30 33/562 |
| 1,389,486 | A | * | 8/1921 | Brewer | G01B 3/34 33/562 |
| 1,827,375 | A | * | 10/1931 | Schneider | G01B 3/30 33/562 |
| 5,199,180 | A | * | 4/1993 | Yablonsky | G01B 3/30 33/501.45 |
| 5,473,966 | A | * | 12/1995 | Cordon | A61K 9/703 33/563 |
| 8,887,407 | B2 | * | 11/2014 | Silva | B64F 5/10 33/562 |
| 2004/0003507 | A1 | * | 1/2004 | Jordan | H02G 3/00 33/566 |
| 2005/0044739 | A1 | * | 3/2005 | Blouch | B25H 7/00 33/562 |
| 2005/0081395 | A1 | * | 4/2005 | Miller, Jr. | G01B 3/30 33/492 |
| 2005/0160611 | A1 | * | 7/2005 | Nave | G01B 3/42 33/501.45 |
| 2007/0017108 | A1 | * | 1/2007 | Hanson | B43L 7/02 33/479 |
| 2009/0265949 | A1 | * | 10/2009 | Ruppe, III | B43L 7/02 33/563 |
| 2011/0154673 | A1 | * | 6/2011 | Herth | B25H 7/00 33/562 |

* cited by examiner

*Primary Examiner* — Christopher W Fulton
(74) *Attorney, Agent, or Firm* — Dennis L. Thomte; Thomte Patent Law Office LLC

(57) ABSTRACT

A wire cutback template for use in cutting layers of insulating material from a cable. The method of using the template is also described.

3 Claims, 6 Drawing Sheets

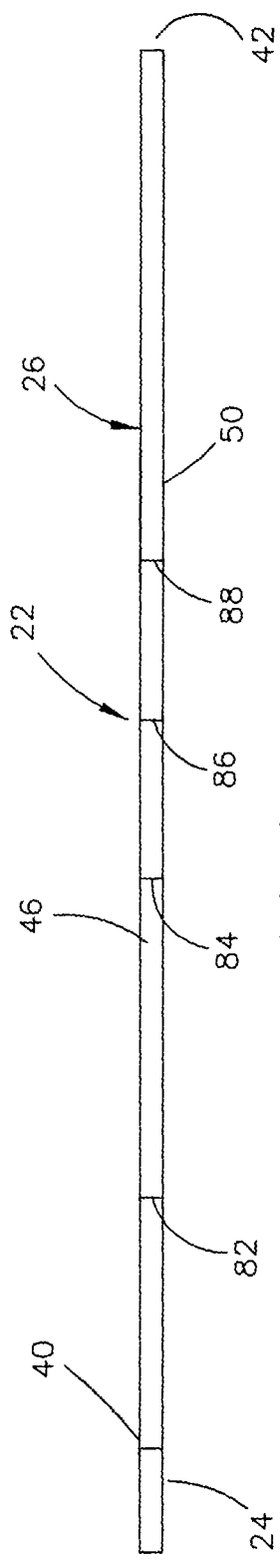
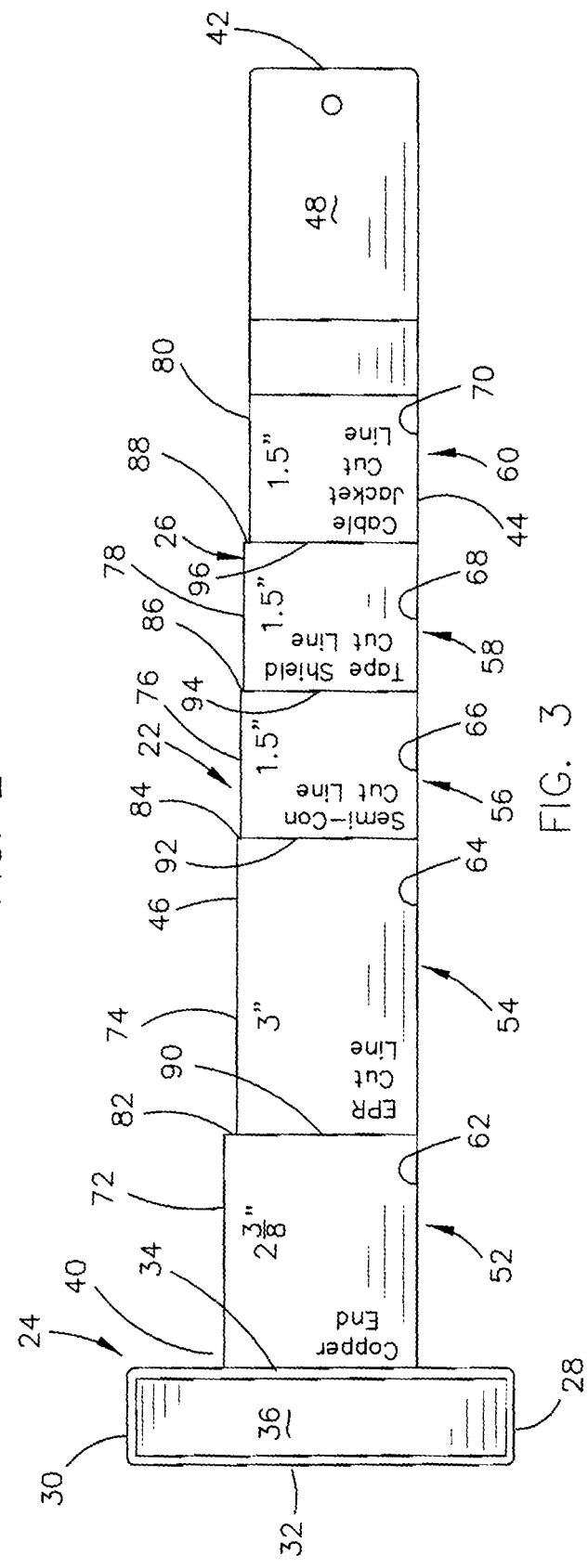

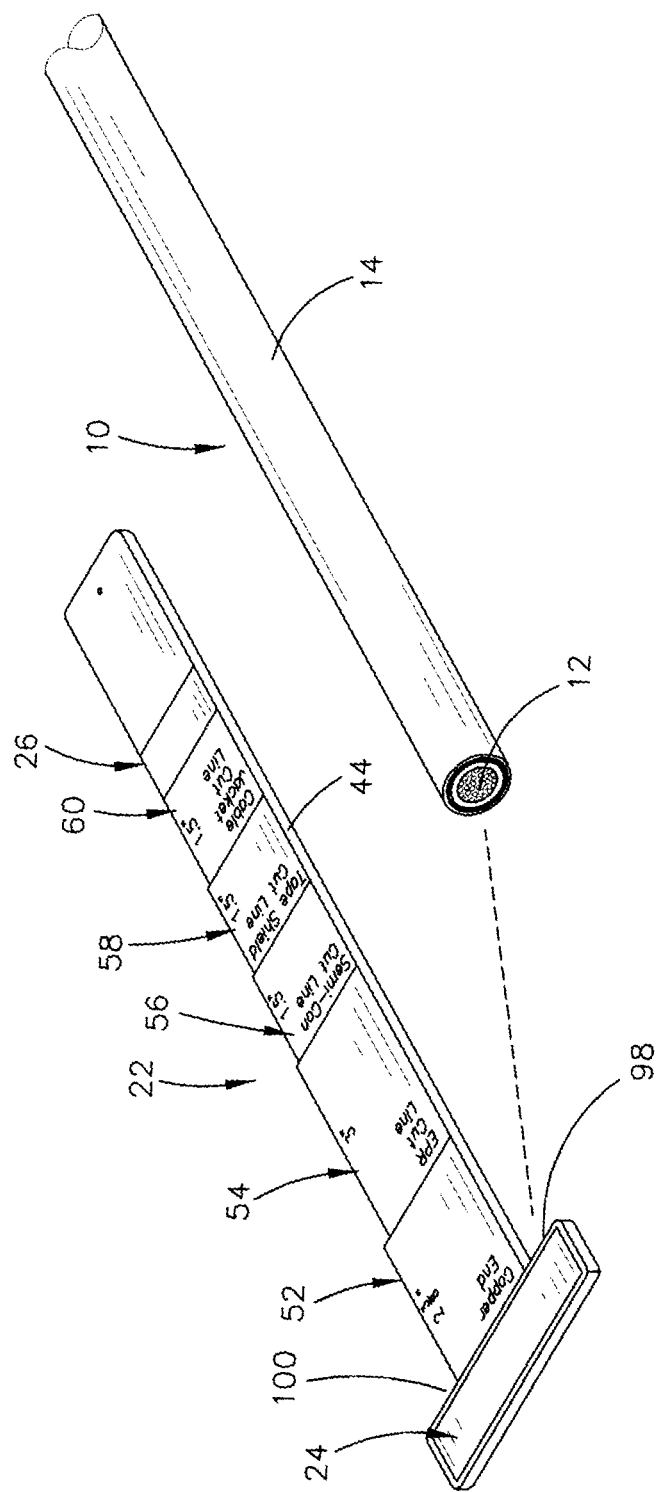

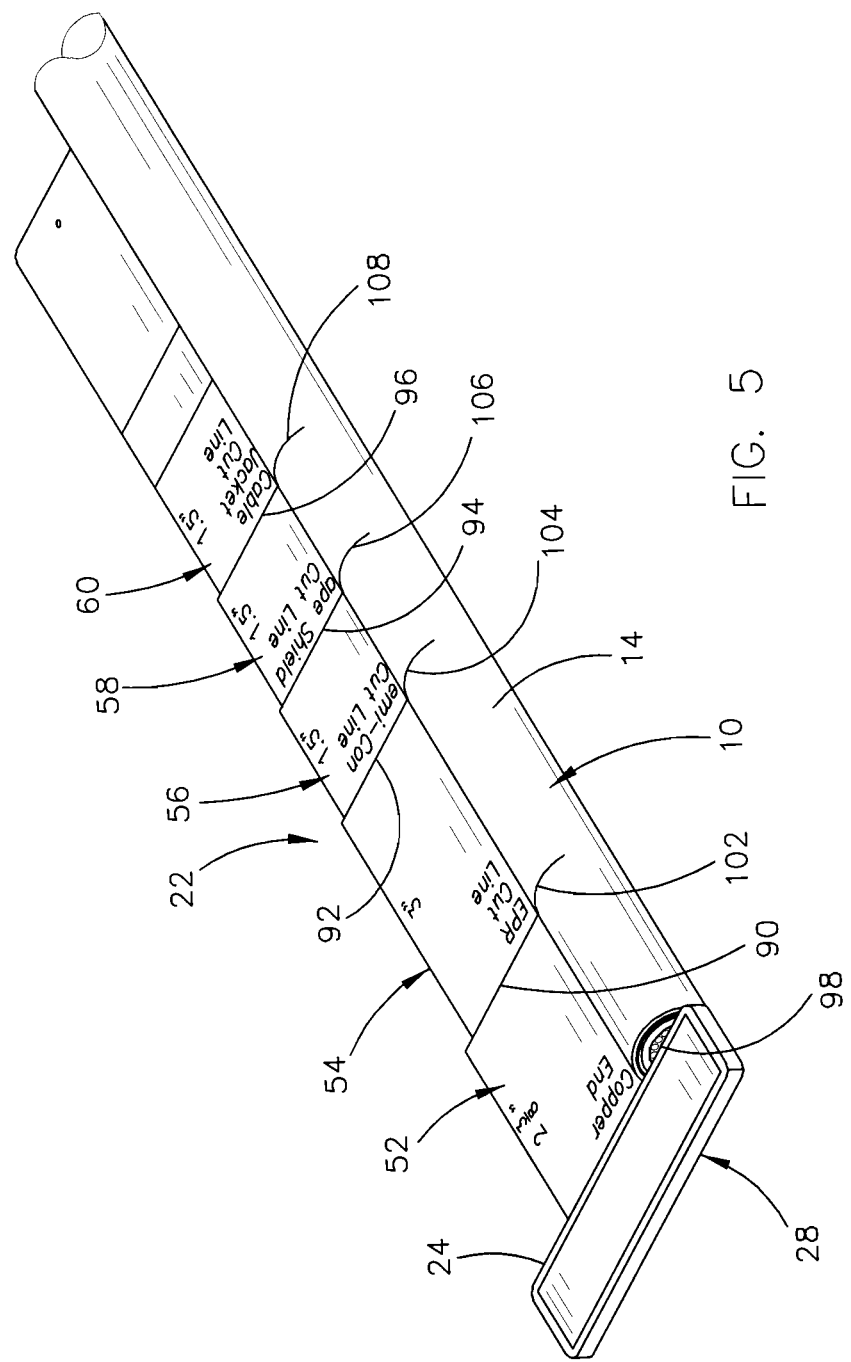

WIRE CUTBACK TEMPLATE

BACKGROUND OF THE INVENTION

Field of the Invention

This invention relates to a template for use in marking an electrical cable to be cutback. More particularly, this invention relates to a template which may be used to check the accuracy of the cutback portions of the wire. The method of using the template is also described.

Description of the Related Art

Electrical wires normally have a metal conductor which has several layers of insulation covering the metal conductor. Each of the layers of insulation must be cutback or stripped back by an exact amount so that whatever is put on the end of the cable, such as a coupler, end, etc., will fit over the different insulation layers correctly, to ensure the integrity of the connection.

In the past, the person performing the cutback procedure of the wire would use a measuring tape to mark each section of the cable to be cutback. Frequently, the tape measure could slip somewhat which would affect the accuracy of the cutback procedure.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A template is described for use in marking an electrical cable to be cutback. The template includes a transversely extending and rectangular end member, having first and second ends, and forward and rearward sides. A generally rectangular body member has its forward end secured to the rearward side of the rectangular end member and extends transversely therefrom. The body member includes a straight first side edge, a second side edge, a forward end and a rearward end. A plurality of cutback sections are provided on the body member which extend rearwardly from the rectangular end member to the rearward end of the body member in an end-to-end manner. The cutback sections have decreasing widths as they progress rearwardly from the forwardmost cutback section to form a plurality of spaced-apart shoulders on the second side edge of the body member. Cut-lines extend from the shoulders to the first side edge of the body member.

In use, the cable will be positioned adjacent the straight first side edge of the body member with the end of the conductor of the cable engaging the rearward end of the rectangular end member with the cable being positioned adjacent the straight first side edge of the body member. The cable is then marked to correspond to the cut-lines. The cable is then stripped in conventional fashion. The stripped end of the cable is then placed adjacent the second side edge of the body member to see if the cutback layers coincide or register with the shoulders on the second side edge of the body member.

It is therefore a principal object of the invention to provide an improved wire cutback template.

A further object of the invention is to provide a wire cutback template which may be used to mark a cable for cutback purposes and which may be used to check the accuracy of the cutback portions.

A further object of the invention is to provide a wire cutback template which is easy to use and which is extremely accurate.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a side view as seen from the second side of the template;

FIG. 3 is a top view of the template;

FIG. 4 is an exploded perspective view of the template and the cable which will be marked and cutback;

FIG. 5 is a perspective view illustrating the cable being positioned adjacent the template with the cable being marked for cutback;

DESCRIPTION OF THE PREFERRED EMBODIMENT

Figure 1:
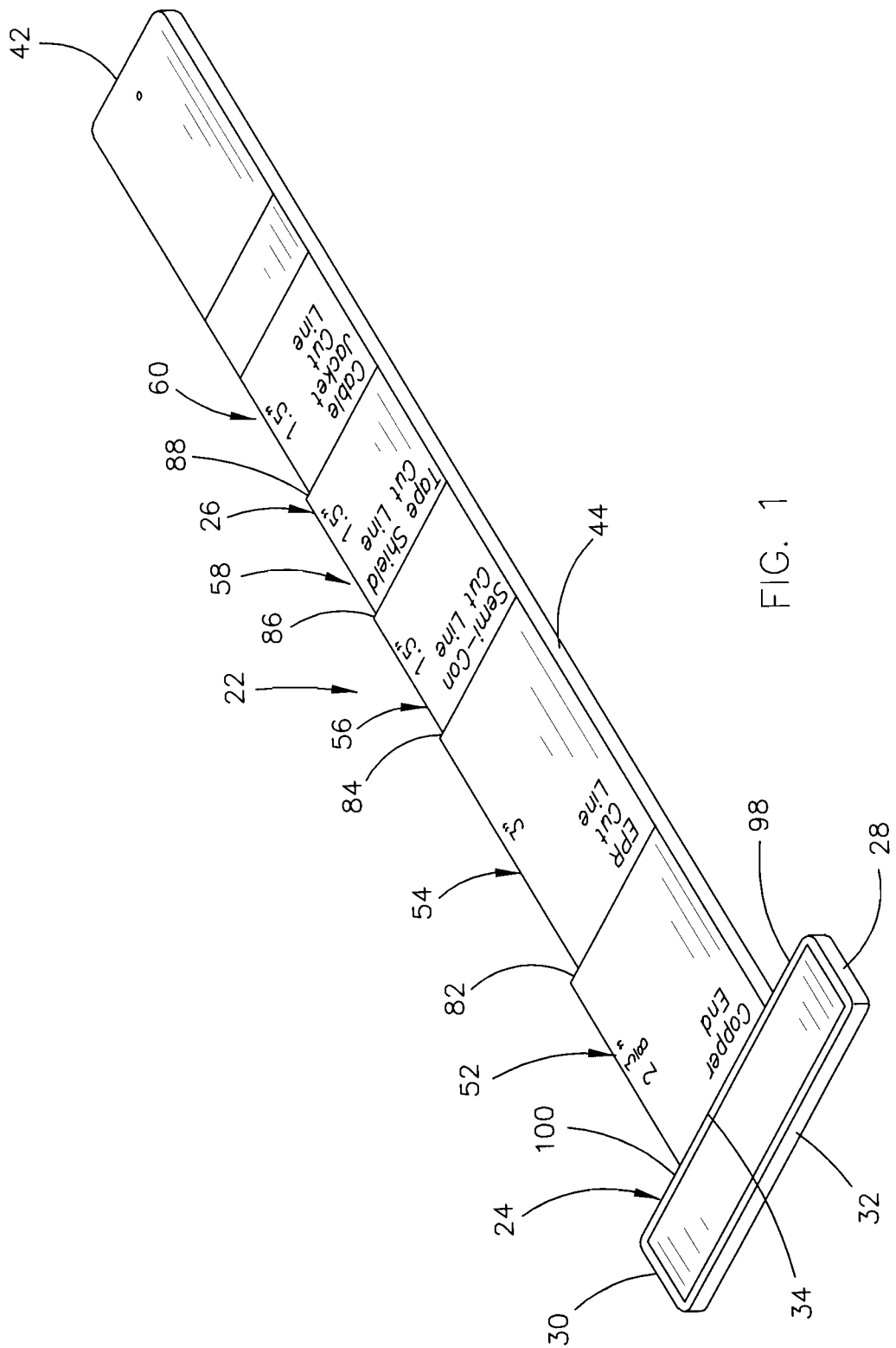
FIG. 1 is a front perspective view of the template of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the electrical cable which is to be cutback for connection of the cutback cable to whatever the cable is to be connected. Cable 10 includes a central conductor 12 which normally has several layers of insulation extending therearound. For purposes of this application, the conductor 12 will be described as having layers 14, 16, 18 and 20 extending around the conductor 12.

The template of this invention is referred to by the reference numeral 22 which may be used to assist in marking the cable 10 for cutback purposes. Further, the template 22 may be used to check the accuracy of the various cutback portions as will be described in detail hereinafter.

Template 22 generally includes a horizontally disposed flat and rectangular end member 24 and a horizontally disposed body member 26. End member 24 includes a first end 28, a second end 30, a forward end 32, a rearward end 34, an upper surface 36 and a lower surface 38. Body member 26 includes a forward end 40, a rearward end 42, a straight first side edge 44, a second side edge 46, an upper surface 48 and a lower surface 50.

Body member 26 includes a plurality of cutback sections 52, 54, 56, 58 and 60 which extend from the forward end 40 of body member 26 to the rearward end 42 of body member 26 in an end-to-end manner. Cutback sections 52, 54, 56, 58 and 60 have first side edges 62, 64, 66, 68 and 70 respectively which are aligned with one another to form the straight first side edge 44 of body member 26. Cutback sections 52, 54, 56, 58 and 60 have second side edges 72, 74, 76, 78 and 80 respectively. As seen, the widths of cutback sections 54, 56, 58 and 60 are progressively less than the cutback section forwardly thereof. The progressive decreasing widths of the cutback sections create rearwardly facing shoulders 82, 84, 86 and 88. Cutback lines 90, 92, 94 and 96 extend from shoulders 82, 84, 86 and 88 to side edge 44 as seen in FIG. 3. Each of the cutback sections 52, 54, 56, 58 and 60 have length indicia thereon relating to information relative to length of the cutback section, etc.

As seen, the width of cutback section 52 is less than the length of rectangular end member 24 to define shoulder portions 98 and 100 which protrude outwardly at the forward end of cutback section 52.

The template 22 is used as follows. The template 22 is preferably placed on a horizontally disposed surface. The cable 10 is then positioned adjacent the straight first side edge 44 so that the end of the cable abuts against the shoulder 98. The user then draws a line 102 on the cable 10 which registers with the cutback line 90. The user then draws lines 104, 106 and 108 on the cable 10 which register with cutback lines 92, 94 and 96 respectively.

Figure 6:
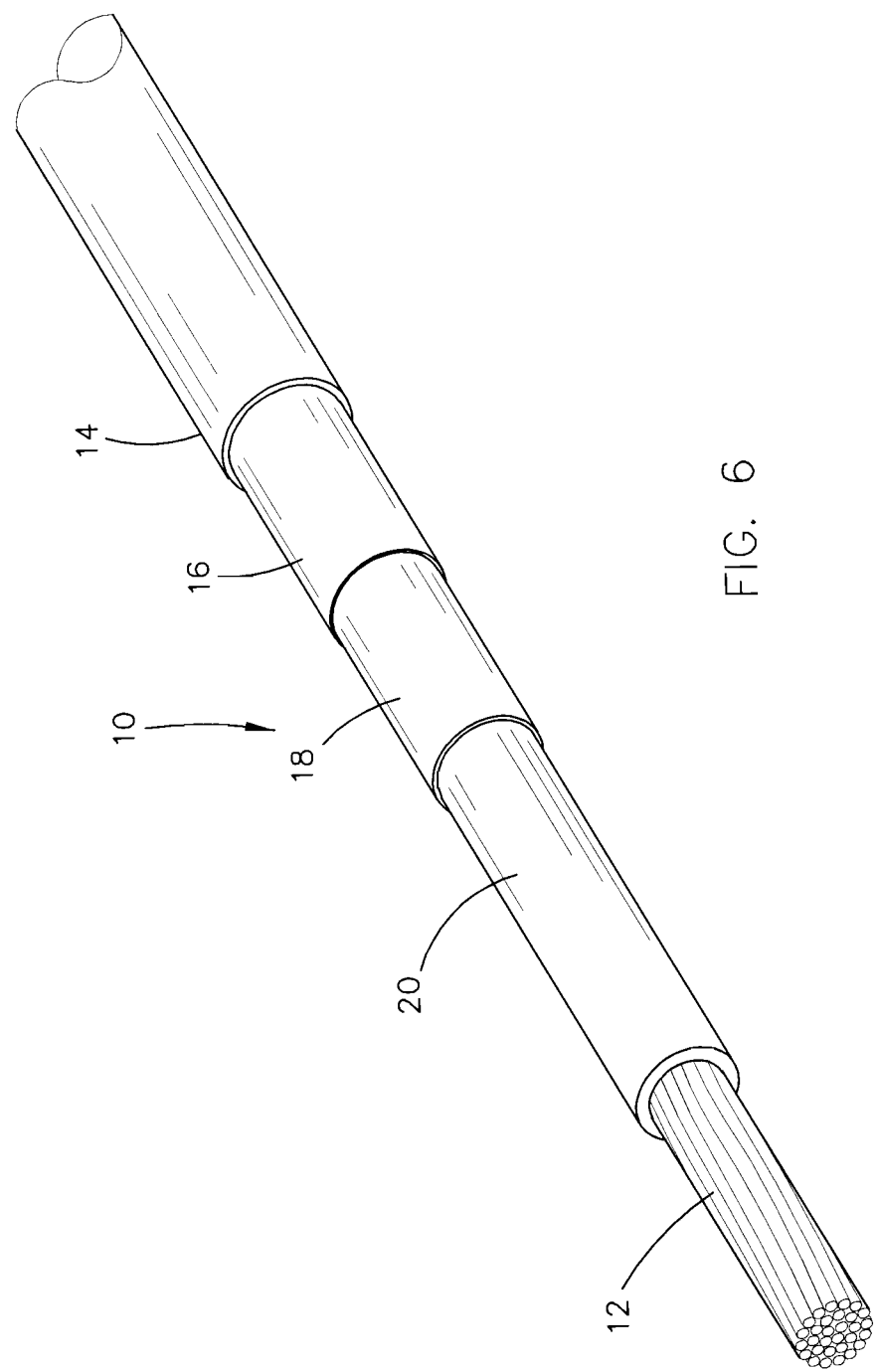
FIG. 6 is a perspective view illustrating the cable having been cutback.

The user then removes the marked cable from engagement with the template 22 and uses a wire or cable stripper to expose the conductor 12. The wire stripper is then used in conventional fashion to expose layers 20, 18 and 16 as seen in FIG. 6.

Figure 7:
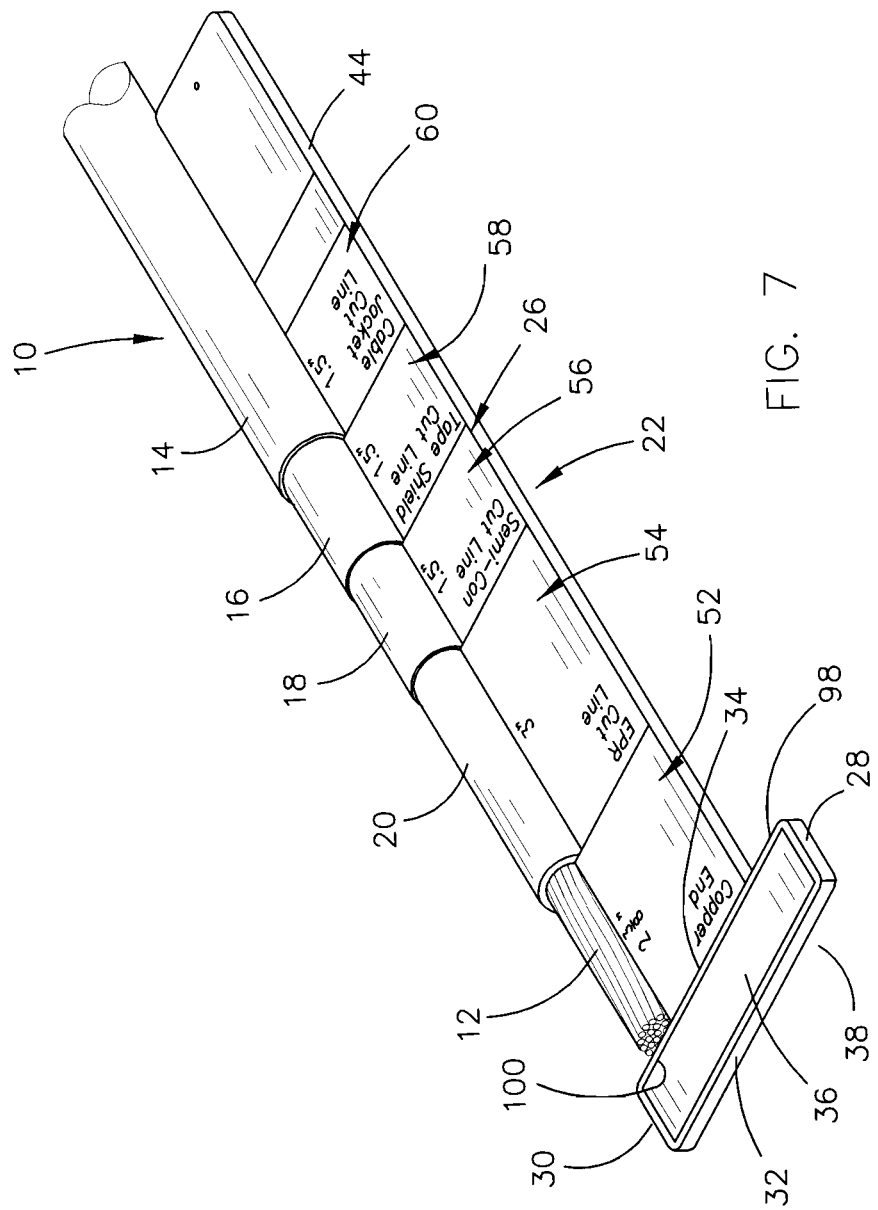
FIG. 7 is a perspective view illustrating the cutback cable being positioned adjacent the second side of the body member to check the accuracy of the cutback portions.

The user then places the cutback cable 10 adjacent the second side edge 46 with the end of conductor 12 being in engagement with the shoulder 100 as seen in FIG. 7. The user then visually checks to see if the ends of layers 20, 18, 16 and 14 register with the shoulders 82, 84, 86 and 88 to verify the integrity of the stripping operation.

The drawings illustrate one version of the templates 22. Other templates may be provided which have more or less cutback sections. Further, other templates may be provided which have cutback sections having different widths and lengths.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A cutback template for an elongated cable having a central electively conductor and a plurality of layers of insulation extending therearound, comprising:
   a horizontally disposed, flat and elongated rectangular end member having a first end, a second end, a forward side, a rearward side, a lower surface and an upper surface;
   a horizontally disposed, flat and elongated body member having a forward end, a rearward end, a straight first side edge, a second side edge, an upper surface and a lower surface;
   said forward end of said body member being joined to said rearward side of said rectangular end member;
   said body member extending transversely from said rearward side of said rectangular end member;
   said body member having a width which is less than the length of said rectangular end member whereby a first shoulder portion is defined at said first end of said rectangular end member at said rearward side of said rectangular arm member and whereby a second shoulder portion is defined at said second end of said rectangular end member at said second end of said rectangular arm member at said rearward side of said rectangular end member;
   said body member having a plurality of cutback sections which are joined together and which extend rearwardly from said forward end of said body member towards said rearward end of said body member in an end-to-end manner;
   each of said cutback sections having a forward end, a rearward end, a first side edge and a second side edge;
   said first side edges of said cutback sections being aligned with one another to form said straight first side edge of said body member;
   each of said cutback sections, which are positioned rearwardly of the forwardmost cutback section, having a width which is less than the cutback section immediately forwardly thereof to create a series of spaced-apart rearwardly facing shoulders in said second side edge of said body member; and
   a cut-line formed on said upper surface of said body member which extends from each of said shoulders to said straight first side edge of said body member.

2. The template of claim 1 wherein length indicia is formed on the upper surface of each of said cutback sections.

3. The template of claim 1 wherein cutback information is formed on said upper surface of said cutback sections.

* * * * *